Oct. 3, 1972  KANEHIRO HIRAKAWA  3,695,905
APPARATUS FOR PRODUCTION OF CASTELLA OR SOFT CAKE
Original Filed April 22, 1970
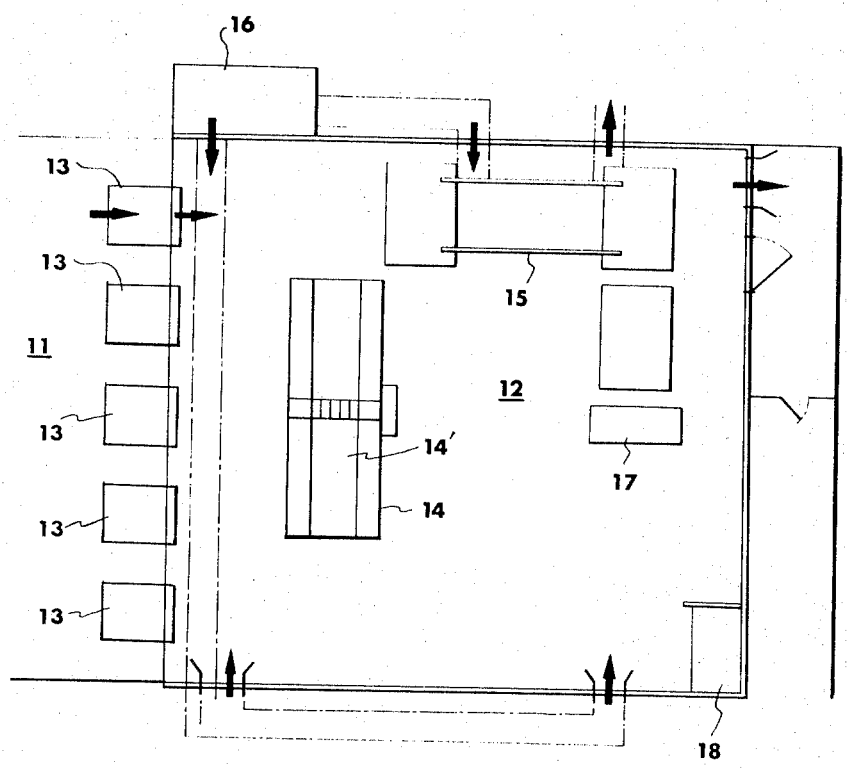
INVENTOR
KANEHIRO HIRAKAWA
BY Toren and McGrady
ATTORNEYS

United States Patent Office 3,695,905
Patented Oct. 3, 1972

3,695,905
APPARATUS FOR PRODUCTION OF CASTELLA
OR SOFT CAKE
Kanehiro Hirakawa, 2–10 Fujigaya 2-chome, Kugenuma
Fujisawa-shi, Kanagawa-ken, Japan
Original application Apr. 22, 1970, Ser. No. 30,820.
Divided and this application July 26, 1971, Ser.
No. 166,000
Int. Cl. B65b 55/12
U.S. Cl. 99—356                    4 Claims

ABSTRACT OF THE DISCLOSURE

In producing castella or soft cake, it is baked in an oven positioned between an operation room and a sterilization room which is sealed from the surrounding atmosphere. After removal from the oven into the sterilization room, the castella is first cut to size, its surface is rapidly dried, and finally the castella is packed and hermetically sealed in synthetic resin containers.

This is a division of patent application Ser. No. 30,820 of Apr. 22, 1970, entitled "A Method for Production of Castella or Soft Cake."

SUMMARY OF THE INVENTION

In the present invention castella or soft cake is produced in a sterilization chamber and packed and sealed in a container so that it may be preserved for a long time (2 or 3 months) without losing its flavour and moisture. The present invention relates more specifically to an apparatus for the production of castella or soft cake comprising baking, sterilizing and dividing into a desired size the castella or soft cake in an apparatus comprising an operation room and a sterilization room which is completely sealed from the surrounding atmosphere and is adjoined to the operation room, a plurality of ovens each having a sterilization device is arrayed in one row along the boundary between the operation and sterilization rooms, the sterilization room has its door closed when the door of the operation room is opened and vice versa, making the castella or soft cake in contact with the air flow from an air conditioner, thereby removing the excess water content only from the surfaces of the castella or soft cake, and packing and sealing into a synthetic resin container having no air permeability and no toxicity, thereby enabling the castella or soft cake to be preserved for a long time without growing mold, and losing flavour and moisture.

The castella or soft cake having moisture is generally produced under sterilized conditions, but the castella has no inherent flavour immediately after the castella is produced. After being left for 10 to 15 hours, the desired flavour of the castella or soft cake is produced so that the growing of mold cannot be prevented when the castella is left for a long time. Because of its inherent ingredients, castella or soft cake tends to grow the mold. This tendency is enhanced under the weather and temperature conditions favourable for growing mold. Especially in summer time, the mold grows in about three days. In order to prevent the growing of the mold, a suitable chemical agent or the like is previously added in the castella or soft cake or the castella or soft cake is sterilized with heat. However, the castella or soft cake processed by the conventional methods so as to protect it from spoilage and loss of its special character such as flavour, texture, aroma, etc. tends to lose its flavour and aroma.

It is, therefore, the primary object of the present invention to provide an apparatus for the production of castella or soft cake comprising baking, sterilizing and dividing the castella or soft cake in a sterilization room and without exposing it to the surrounding atmosphere when the castella or soft cake is transferred to the sterilization room from an operation room, contacting the castella or soft cake with air flow in a tunnel so as to remove the water content only from the surfaces or skins of the castella or soft cake, and hermetically sealing the castella or soft cake in a sterilized container, thereby enabling the castella or soft cake to be preserved for a long time without losing its special character such as flavour, aroma, etc., without the addition of chemicals or effecting heat-treatment.

It is another object of the present invention to provide an apparatus for the production of castella or soft cake under completely sterilized conditions attained by the combination of a sterilization room and a completely hermetical sealing container, thereby providing the castella or soft cake having suitable moisture but being unharmful and well protected against spoilage.

It is a further object of the present invention to provide an apparatus for the production of castella or soft cake which can automatically transfer the castella or soft cake from a sterilization room adjoining a production room through an oven having a sterilization device to an automatic divider, dry only the surfaces or skins of the castella or soft cake in a tunnel through which air flows, and hermetically seal the castella or soft cake into a completely sterilized container, thereby improving the productivity.

The drawing is a single figure which is a block diagram for the explanation of the various devices used for the production of castella or soft cake in accordance with the present invention.

The present invention will become more apparent from the following description of one preferred embodiment thereof taken in conjunction with the accompanying drawing.

In the drawing a sterilization chamber 12 adjoins an operation chamber 11 and a plurality of ovens 13 are disposed in one row along the boundary between the operation and sterilization chambers 11 and 12. It should be noted that each of ovens 13 has its own sterilization device.

When the door of the operation chamber is opened, the door of the sterilization chamber 12 is closed and cannot be opened as long as the door of the operation chamber 11 remains opened. Castella baked in the sterilization atmosphere is emptied into the sterilization chamber 12 where castella is divided by an automatic divider 14 into the desired size. The divided castella is charged into a wind tunnel 15 wherein the castella is contacted with the air from an air conditioner 16 in which lithium chloride or triethylene glycol is atomized and filtered, whereby the castella may be sterilized while the excess water content is removed from the surface of the castella. Next the castella is sealed into a container, such as a polypropylene container, having no air permeability and no toxicity and the opening is hermetically sealed by a heater or welding machine 17. The polypropylene containers are previously sterilized in an electronic range or the like at 90° C. for 30 seconds before the castella is packed in the polypropylene container.

The sealed castella is discharged out of the sterilization chamber 12 through a discharge opening or gate 18 having a double-shutter device.

The castella thus produced may be preserved for a long time. According to the experiments, no mold grew and flavour was not changed at all even after the castella had been left for 2 or 3 months in a room at room temperature of 25° C.

When castella is packed and wrapped in such conventional containers as wooden or paperboard boxes for preserving the castella for a long time, the surface of the castella is dried and solidified because of the greater permeability of these packing materials and, as a result, the flavour is lost. In the conventional production apparatus, the surface temperature of the castella just discharged out of the oven is generally about 90° C. while the temperature at the center thereof is about 150° C. so that the castella must be left for 15 to 20 hours so as to cool the temperature before the next step is effected. But in accordance with the present invention, the castella is treated in the wind tunnel for a short time of 15 to 20 minutes in an atmosphere of 15 to 25° C., with a moisture content of 20 to 30% and velocity of 10 m./sec. so that water is rapidly removed only from the surface of the castella and the castella is immediately sealed in containers having no air permeability. Therefore, the moisture in the castella will not be permitted to leach toward and through the surface of the castella. Thus, the accumulation of the water particles upon the inner surface of the packing container can be completely eliminated.

Next one example of the present invention will be described.

The castella was discharged from the oven 13 and divided into size by the automatic divider 14 and loaded upon a conveyor 14'. The air from the air conditioner 16 is directed to flow in the direction opposite to that of running of the conveyor 14'. Various data are as follows:

Dimensions: 260 mm. (L) x 100 mm. (W) x 60 mm. (T).
Weight: Before drying: 629 gr.; after drying: 610.5 gr. including a polypropylene container.
Initial temperature: 100° C.
Temperature after treatment: 15° C.
Specific heat: 0.5.
Drying air at entrance: 20 to 25° C.; 15% RH (relative humidity); absolute water content: 0.0016 kg.
Production: 2,000 kin per day.
Operating hours: 8 hours a day.
Formula for obtaining water loss on drying:

$$dW = \frac{\alpha A \Delta t}{\eta o}$$

where $dW$=water loss on drying, kg./hr.
$A$=surface area
$\eta o$=latent heat of water=590 kcal./kg.
$\alpha$=surface thermal conductivity, kcal./hm.$^2$° C.
$t$=difference between the temperatures of the wet- and dry-thermometer, ° C.

$$\alpha = 5.11 \times \frac{U \times 0.8}{l \times 0.2}$$

where $U$=wind velocity, m./sec.
$l$=length of the castella in meters

Wind tunnel: 750 mm. in width and 125 mm. in height. Since the first baked castella is produced two hours after the operation is started and the charging of the castella into the wind tunnel is stopped one hour before the operation is stopped, the net operating time of the wind tunnel is 5 hours.
Weight of castella treated per hour in the wind tunnel: 2,000 kin/5 hours=400 kin. The castella 5 kins in weight were arrayed upon the conveyor.
The surface area of the castella: 0.26 (0.1+0.6+0.6) +0.1×0.06=0.0632 m.². The surface areas of the bottoms and the side walls or skins of the castella or the trailing walls on the lee of the air flowing through the wind tunnel were not included because the drying of these surfaces was much delayed as compared with other surfaces.

The air velocity: 10 m./sec.
The surface thermal conductivity: 42 kcal./h.m.² ° C.
The air flow rate: 0.75×0.125×10×60=66 m.²/min.; =3,960 m.²/h.; =4,850 kg./hr.
Water loss on drying: 0.629−0.6105=0.0185 kg./kin.
Water evaporation in the wind tunnel:
  400 kin/water lost from castella per hour:
  0.0185×400=6.4 kg./hr.
Heat dissipated from castella:
  (100−15)×0.629×400×0.5=10,700 kcal./hr.
Increase in water content in air:
  6.4/4,850=0.0013 kg./kg. of air.
Air temperature rise:

$$\frac{10,700}{0.24 \times 4,850} = 9.25° C.$$

Air at outlet: Drying temperature: 15+9.25=24.25° C.; water content: 0.0016+0.0013=0.0029 kg./kg.; temperature of the wet-bulb thermometer: 11.1° C.
$\Delta t$: at inlet: 15.0−5.2=9.8° C.; at outlet: 24.25−11.1 =13.15° C.; taking into consideration of a safety factor: 9.8° C.
Water loss on drying:

$$dW = \frac{\alpha A \Delta t}{\eta o}$$
$$= \frac{4.2 \times 0.0632 \times 400 \times 9.8}{590} = 17.8 \text{ kg./hr.}$$

Drying time: Since the water loss on drying per hour is 6.4 kg./hr. 6.4/17.8=0.36 hr.=22 minutes. This means that the castella could be dried when passed through the wind tunnel in 200 minutes.
The length of the conveyor belt used for drying: Equivalent to 30 minutes. Castellas having a length of 260 mm. were spaced apart from each other by 100 mm.
Number of castellas upon the conveyor belt: 400/2=200 kin=200 pcs.
When arrayed in five columns: 200/5=40; 260×40 =100×41=14.5 m.
Air conditioner atmosphere: 32° C. D.B., 27° C. W.B., 68% RH. and 0.0206 kg./kg.
Flow rate: 66 m.²/min.=4,850 kg./hr.
Intake: 13.2 m.²/min. on the assumption that 20% of the total air was taken from the atmosphere.
Conditioned air: 15° C., D.B., 52° C., W.B., 15% RH, and 0.0016 kg./kg.
Recirculated air: 24.3° C., D.B., 11.1° C., W.B.; 15% RH; and 0.0029 kg./kg.
Air at inlet of air conditioner: 26° C., D.B.; 15.1° C, W.B.; 32% RH, and 0.0065 kg./kg. The air dehumidified by use of sodium chloride to 20% at 10° C. The air thus dehumidified was reheated to 15° C. and 15% in moisture content and directed to the air conditioner.
Water loss on dehumidifying: (10.1−3.25)×4,850=33,-200 kcal./hr.
Quantity of heat for reheating: (4.5−3.25)×4,850=5,070 kcal./hr.
Water loss on dehumidifying: (0.0065−0.0015)×4,850 =24.25 kg./hr.
Heat from solution regenerator: The solution absorbed water so that its concentration was reduced. Therefore, the solution was returned to the regenerator, thereby increasing the desired concentration.
Concentration at dehumidifier: 40%.
Concentration improved by the regenerator: 42%.
Water discharged in the regenerator: 24.25 kg./hr. 40% aqueous solution: water, 60 gr.; BrCl or LiCl; 40 gr.; total: 100 gr.; 42% aqueous solution: water, 58 gr.; LiCl, 42 gr.; total, 100 gr.; water, 55 gr.; LiCl, 40 gr.; total: 95 gr. That is, when an amount of 100 gr. of water was circled through the regenerator, 5 gr. of water was discharged. That is, a water content of 5% was lost.

The flow rate:

$$\frac{24.25}{0.05} = 485 \text{ kg./hr.}$$

The temperature of the solution returned from the regenerator was 80° C.; the temperature of the solution in the dehumidifier was 8° C.

The specific heat of the solution: 0.65.

The quantity of heat of the solution returned: $(80-8) \times 0.65 \times 485 = 24{,}500$ kcal./hr.

Heat of dilution: 26 kcal./kg.; $26 \times 24.25 = 630$ kcal./hr.

Refrigeration load:                              Kcal./hr.
    Heat for evaporation of water _____ 33,200
    Heat of dilution _____ 630
    Heat from regenerator _____ 24,500
                                             58,330

Under the above conditions, the castella was dried and packed into the polypropylene containers and sealed by the heat sealing machine. No mold grew in the castella even after 2 or 3 months.

What is claimed is:

1. Apparatus for the production of castella or soft cake comprising walls forming an operation room, walls forming a sterilization room having a common wall with said operation room, said sterilization room being sealed from the surrounding atmosphere, a row of baking ovens positioned in said common wall between said operation room and sterilization room and being openable to both said rooms, a sterilizing device within each of said ovens, means positioned within said sterilizing room for dividing the castella received from said ovens into the desired size, means forming a wind tunnel in said sterilization room for receiving the castella which has been cut to size for removing the moisture from the surfaces of the castella, and means arranged to receive the castella from the wind tunnel for packaging and sealing the castella in a sterilized container.

2. Apparatus, as set forth in claim 1, wherein a device arranged for opening and closing the doors of said operation room and sterilization room so that when one of the doors thereof is opened the other door is maintained in the closed position.

3. Apparatus, as set forth in claim 1, wherein an air conditioner being disposed in communication with said sterilization room and said wind tunnel for supplying air under selected conditions thereto.

4. Apparatus, as set forth in claim 1, wherein an electronic range being arranged for sterilizing the containers used for packaging the castella.

References Cited

UNITED STATES PATENTS

| | | | |
|---|---|---|---|
| 2,645,557 | 7/1953 | Lewis et al. | 99—361 X |
| 3,255,690 | 6/1966 | Schack et al. | 99—182 X |
| 3,269,079 | 8/1966 | Schmied | 99—182 UX |
| 3,332,788 | 7/1967 | Barnby | 99—182 |
| 3,401,043 | 9/1968 | Finley et al. | 99—182 |
| 3,470,674 | 10/1969 | Madonia | 99—172 |

FOREIGN PATENTS

| | | | |
|---|---|---|---|
| 16,362 | 12/1890 | Great Britain | 99—172 |

WALTER A. SCHEEL, Primary Examiner

A. O. HENDERSON, Assistant Examiner

U.S. Cl. X.R.

99—172